United States Patent
Maytubby et al.

(10) Patent No.: US 11,096,523 B2
(45) Date of Patent: Aug. 24, 2021

(54) BIFURCATED SEALING MEMBER

(71) Applicant: Vita-Mix Management Corporation, Olmsted Township, OH (US)

(72) Inventors: Travis Maytubby, Olmsted Township, OH (US); John Schroeder, Olmsted Township, OH (US)

(73) Assignee: VITA-MIX MANAGEMENT CORPORATION, Olmsted Township, OH (US)

( * ) Notice: Subject to any disclaimer, the term of this patent is extended or adjusted under 35 U.S.C. 154(b) by 25 days.

(21) Appl. No.: 15/798,938

(22) Filed: Oct. 31, 2017

(65) Prior Publication Data

US 2018/0116463 A1    May 3, 2018

Related U.S. Application Data

(60) Provisional application No. 62/415,068, filed on Oct. 31, 2016.

(51) Int. Cl.
*A47J 43/046* (2006.01)
*A47J 43/07* (2006.01)

(52) U.S. Cl.
CPC ......... *A47J 43/046* (2013.01); *A47J 43/0716* (2013.01)

(58) Field of Classification Search
CPC ..................... A47J 43/046; A47J 43/0716
See application file for complete search history.

(56) References Cited

U.S. PATENT DOCUMENTS

| | | |
|---|---|---|
| 2,955,186 A | 10/1960 | Ritter |
| 3,299,226 A | 1/1967 | Edwards |
| 3,548,280 A | 12/1970 | Cockroft |
| 3,731,059 A | 5/1973 | Wilson |
| 3,943,421 A | 3/1976 | Shibata et al. |
| 3,951,351 A | 4/1976 | Emster et al. |
| 4,568,193 A | 2/1986 | Contri et al. |
| 4,686,356 A | 8/1987 | Ueda et al. |
| 4,762,057 A | 8/1988 | Hirota et al. |
| 4,822,172 A | 4/1989 | Stottmann |
| 4,893,942 A | 1/1990 | Stottmann |
| 4,968,864 A | 11/1990 | Doi et al. |
| 5,156,867 A | 10/1992 | Leuthold et al. |

(Continued)

FOREIGN PATENT DOCUMENTS

| | | |
|---|---|---|
| CN | 1860663 | 11/2006 |
| CN | 200939970 | 8/2007 |

(Continued)

OTHER PUBLICATIONS

Copenheaver, Blaine, International Search Report and Written Opinion, PCT/US2014/029134, dated Aug. 1, 2014, International Search Authority/USA.

(Continued)

*Primary Examiner* — Elizabeth Insler
(74) *Attorney, Agent, or Firm* — McDonald Hopkins LLC

(57) ABSTRACT

A blender system includes a blender base, a container and a blade assembly. The container is attached to the blender base. The blade assembly is attached to the container. The blender base includes a motor. The motor drives the blade assembly. The blade assembly includes a shaft and a blade. A gasket is positioned about the shaft. The gasket seals the shaft and the blade from a cavity of the container.

20 Claims, 4 Drawing Sheets

(56) References Cited

U.S. PATENT DOCUMENTS

| | | | |
|---|---|---|---|
| 5,267,211 A | 11/1993 | Kobayashi et al. | |
| 5,267,790 A | 12/1993 | Sutherland et al. | |
| 5,316,382 A | 5/1994 | Penaranda et al. | |
| 5,347,205 A | 9/1994 | Piland | |
| 5,363,746 A | 11/1994 | Gordon | |
| 5,392,695 A | 2/1995 | Junkel | |
| 5,531,153 A | 7/1996 | Maruyama et al. | |
| 5,556,198 A | 9/1996 | Dickson, Jr. et al. | |
| 5,562,020 A | 10/1996 | Shigeshiro | |
| 5,577,735 A | 11/1996 | Reed et al. | |
| 5,605,090 A | 2/1997 | Mantani et al. | |
| 5,660,467 A | 8/1997 | Mineo et al. | |
| 5,768,978 A | 6/1998 | Dorner et al. | |
| 5,829,341 A | 11/1998 | Lin | |
| 5,839,356 A | 11/1998 | Dornbush et al. | |
| 5,967,021 A | 10/1999 | Yung | |
| 6,210,033 B1 | 4/2001 | Karkos, Jr. et al. | |
| 6,364,522 B2 | 4/2002 | Kolar et al. | |
| 6,402,365 B1 | 6/2002 | Wong | |
| 6,609,821 B2 | 8/2003 | Wulf et al. | |
| D480,915 S | 10/2003 | Kolar et al. | |
| 6,959,562 B2 | 11/2005 | Navedo et al. | |
| 7,422,362 B2 | 9/2008 | Sands | |
| D588,406 S | 3/2009 | Ulanski et al. | |
| D621,656 S | 8/2010 | Ulanski et al. | |
| D662,359 S | 6/2012 | Boozer et al. | |
| 8,226,021 B2 * | 7/2012 | Wilson | A47J 43/0716 241/282.2 |
| D678,727 S | 3/2013 | Kolar et al. | |
| 8,529,120 B2 | 9/2013 | Ulanski et al. | |
| 8,814,011 B2 | 8/2014 | Ulanski et al. | |
| 9,259,122 B2 | 2/2016 | Martin et al. | |
| 2002/0009017 A1 | 1/2002 | Kolar et al. | |
| 2002/0176320 A1 | 11/2002 | Wulf et al. | |
| 2004/0203387 A1 | 10/2004 | Grannan | |
| 2005/0099884 A1 | 5/2005 | Lee | |
| 2005/0229795 A1 | 10/2005 | Stuckey | |
| 2006/0086843 A1 | 4/2006 | Lin et al. | |
| 2006/0169715 A1 | 8/2006 | Emmendorfer et al. | |
| 2006/0203610 A1 | 9/2006 | Bohannon, Jr. et al. | |
| 2006/0214765 A1 | 9/2006 | Pitchers et al. | |
| 2007/0221668 A1 | 9/2007 | Baarman et al. | |
| 2010/0208548 A1 | 8/2010 | Hemelgarn | |
| 2011/0189358 A1 | 8/2011 | Herbert | |
| 2011/0199852 A1 | 8/2011 | Martin | |
| 2011/0248108 A1 | 10/2011 | Carriere | |
| 2013/0192477 A1 | 8/2013 | Hoare | |
| 2013/0264405 A1 | 10/2013 | Audette | |
| 2014/0286120 A1 | 9/2014 | Kolar | |
| 2015/0265983 A1 | 9/2015 | Fleming et al. | |
| 2016/0143483 A1 | 5/2016 | Boozer | |
| 2016/0331181 A1 * | 11/2016 | Dickson, Jr. | B01F 7/0025 |

FOREIGN PATENT DOCUMENTS

| | | |
|---|---|---|
| CN | 101194807 | 6/2008 |
| CN | 201899991 | 7/2011 |
| CN | 202312540 | 7/2012 |
| CN | 102892344 | 1/2013 |
| EP | 2548485 | 1/2013 |
| WO | 2005031952 | 4/2005 |
| WO | 2006104651 | 10/2006 |
| WO | 2006124051 | 11/2006 |

OTHER PUBLICATIONS

Young, Lee W., International Search Report and Written Opinion, PCT/US2014/029384, dated Aug. 11, 2014, International Search Authority/USA.

Gaggia Espanola, S.A., ipanerma, brochure, undated.

Gaggia Espanola, S.A., Copacabana, brochure, undated.

Gaggia Espanola, S.A., ipanema Space-Saving High Technology, brochure, undated.

Communication pursuant to Article 94(3) European Patent Office regarding Application No. 14762667.5, dated Nov. 29, 2018.

* cited by examiner

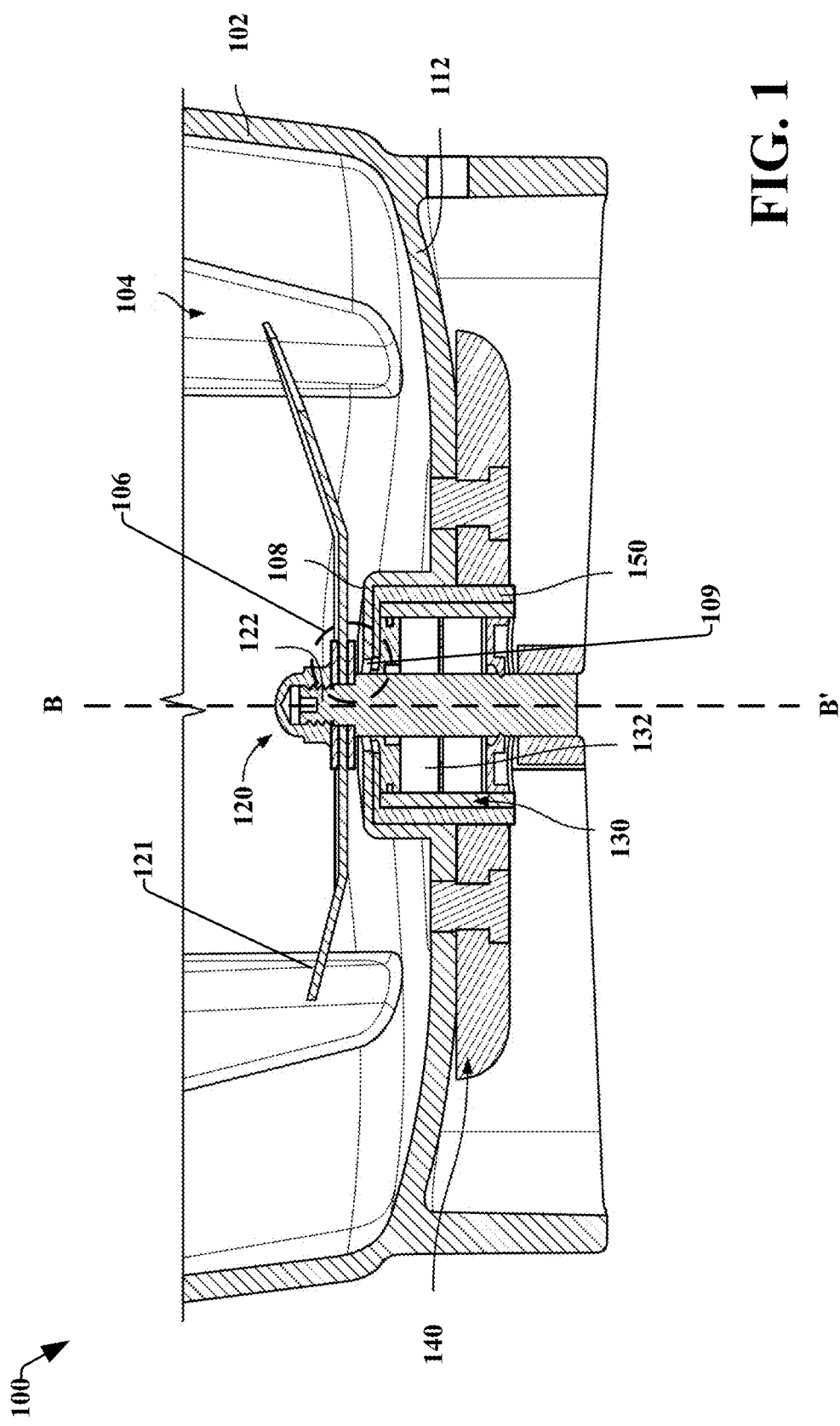

BIFURCATED SEALING MEMBER

CROSS-REFERENCE TO RELATED APPLICATION

This application claims priority to U.S. Provisional Patent Application No. 62/415,068 entitled "BIFURCATED SEALING MEMBER," filed on Oct. 31, 2016, which is incorporated herein by reference in its entirety.

FIELD OF THE INVENTION

The present invention is generally related to a sealing assembly for a blender and, more particularly, to a bifurcated annular seal disposed between the blade assembly and container base.

BACKGROUND

Blenders and blending systems are often used to blend and process foodstuffs. Frozen, frosty, or icy drinks have become increasingly popular. Such drinks include the traditional shakes, and the more recently popular smoothies. Shakes, or milk shakes, are typically formed of ice cream and/or milk, and flavored as desired, with or without additives, such as candies, chocolates, peanut butter, fruits, etc. Milkshakes typically are available at most fast-food restaurants, such as burger chains, and may be made by special machines, or hand-made using mixers.

Smoothies tend to be healthier, and may be formed of ice, frozen yogurt, and/or sorbet. Smoothies may include additives such as fruits, fruit juice, vegetables, vitamins, supplements, etc. Smoothies typically are available from specialty chains or juice bars, and may be made with commercial or restaurant-grade blenders. Such drinks also may be made at home, using a personal blender.

Blenders traditionally include a blade assembly attached with a container. The blade assembly of these blenders often requires complex geometries or specific geometries to assist in mixing the contents in the container appropriately. The blade assemblies are driven by a motor connected to a primary drive shaft to rotate blades of the assembly. Accordingly, components must be provided to ensure that food and liquids do not encroach upon the drive shaft or motor in a way that may promote corrosion, shorting, or mechanical failures. Conversely, any sealing mechanism must minimize friction, wear, and noise between the moving parts.

It may be desirable to seal a blender and operative components of a blade assembly. A need exists for sealing a blender and operative components of a blade assembly, altering friction created by a seal, and increasing efficiency of a blender system.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

A blending system is described. The blending system includes a blending container comprising side walls that define a cavity and a blade assembly operatively attached to the blending container. The blade assembly includes an axle, a blade operatively attached to the axle, and an annular seal disposed around the axle and proximal the blade. The annular seal comprises an upper flange extending away from the axle, and a lower flange extending towards the axle. The blending container may comprise a receiving member comprising an aperture that receives the axle. The upper flange sealingly engages the receiving member. The annular seal is disposed within a cavity defined at least in part by the axle, blade, and receiving member. The blade assembly comprises a bearing assembly disposed about the axle. The cavity is further defined by the bearing assembly. The upper flange extends at an upwards angle relative a closed end of the container. In another example, the upper flange extends at a downwards angle relative a closed end of the container. The lower flange extends at an upwards angle relative a closed end of the container. The lower flange deforms around the axle to create a seal therewith. The upper flange sealingly engages the blade. The receiving member comprises a ledge and wherein the annular seal further comprises a body that engages the ledge.

A blender system comprising a blender base comprising a motor and a splined coupler, a blending container operatively attachable to the blender base, and a blade assembly operatively attachable to the blending container, is described. The blade assembly comprises a shaft comprising a splined end operatively attachable with the splined coupler, a blade extending from the shaft, and a seal disposed about the shaft and proximal the blade, and comprising an upper flange and a lower flange. The upper flange is biased to sealingly engage with at least one of the blades or the blending container when the motor is not driving the shaft. The seal further comprises a body, and wherein the upper flange extends from the body. The body does not contact the shaft when the motor operatively drives the shaft at a threshold speed. The seal comprises an upper body and a lower body that are separate from each other. A force of the sealingly engagement of the upper flange and at least one of the blades or the blending container is lessened when the motor operatively drives the shaft at a threshold speed.

Another blender system is described. The blender system comprises a blender base comprising a housing that houses a motor, a blending container operatively attachable to the housing, and a blade assembly operatively attachable to the blending container. The blade assembly comprises a shaft, a blade extending from the shaft, a bearing assembly; and a gasket comprising an upper flange and a lower flange. The blending container further comprises a receiving portion comprising an opening that operatively receives the shaft. The gasket is disposed within a cavity defined at least in part by the receiving portion, the bearing assembly, the blade, and the shaft. The gasket comprises a polymeric material. The polymeric material comprises at least one of polytetrafluoroethylene, a polytetrafluoroethylene based compound, polyether ether ketone, ultra-high-molecular-weight polyethylene, polychlorotrifluoroethylene, or a polyester/elastomer. The gasket is press-fit within the cavity.

The following description and the drawings disclose various illustrative aspects. Some improvements and novel aspects may be expressly identified, while others may be apparent from the description and drawings.

DESCRIPTION OF THE DRAWINGS

The accompanying drawings illustrate various systems, apparatuses, devices and methods, in which like reference characters refer to like parts throughout. The relative positioning, shape, and functioning of the components (individually and as a system), as well as any numeric or textual information contained in the drawings, form part of this specification and disclosure as if fully described and rewritten herein. In the drawings:

FIG. 1 is a cross-sectional view of at least a portion of a blending system indicating the components and general location of a seal that may be disposed between the blade assembly and the drive axle and/or bearing mount, in accordance with various disclosed aspects.

DETAILED DESCRIPTION

Figure 2A:
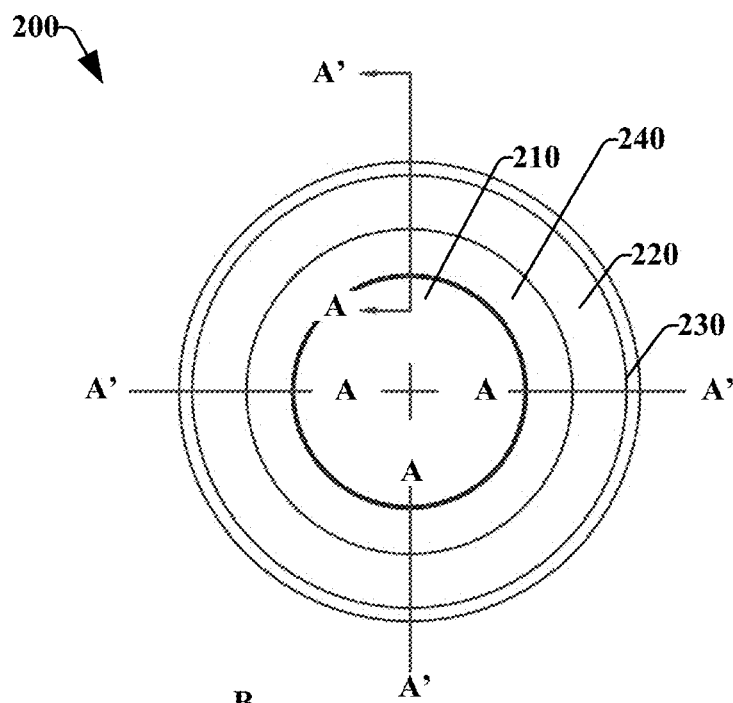
FIG. 2A is a top view and FIG. 2B is a cross-sectional side view taken along line A-A of a bifurcated seal, in accordance with various disclosed aspects.

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

It is noted that the various embodiments described herein may include other components and/or functionality. It is further noted that while various embodiments refer to a blender or a blending system, various other systems may be utilized in view of embodiments described herein. For example, embodiments may be utilized in food processor systems, mixing systems, hand-held blending systems, various other food preparation systems, and the like. As such, references to a blender, blending system, and the like, are understood to include food processor systems, and other mixing systems.

Foodstuff may be added to the blending container. Furthermore, while blending of "ingredients," "contents" or "foodstuffs" is described by various embodiments, it is noted that non-food stuff may be mixed or blended, such as paints, epoxies, construction material (e.g., mortar, cement, etc.), and the like. Further, the blending systems may include any household blender and/or any type of commercial blending system, including those with covers that may encapsulate or partially encapsulate the blender. Further, commercial blending systems may include an overall blending system, such as a modular blending system that may include the blender along with other components, such as a cleaner, foodstuff storage device (including a refrigerator), an ice maker and/or dispenser, a foodstuff dispenser (a liquid or powder flavoring dispenser) or any other combination of such.

Moreover, blending of foodstuff or ingredients may result in a blended product. Such blended products may include drinks, frozen drinks, smoothies, shakes, soups, purees, sorbets, butter (nut), dips or the likes. It is noted that various other blended products may result from blending ingredients. Accordingly, terms such as "blended product" or "drink" may be used interchangeably unless context suggests otherwise or warrants a particular distinction among such terms. Moreover, such terms are not intended to limit possible blended products and should be viewed as examples of possible blended products.

In an embodiment, the blender assembly may include a blending container and a blade assembly. The blending container may comprise a pitcher, bowl, cup, or other general shape. It is noted that the blending container may be configured for single serving use, commercial use, multi-serving use, or the like. The blending container may include or be coupled with (e.g., removably or irremovably) a blade assembly. The blade assembly may include one or more blades having one or more wings.

In some traditional blending systems, blades are driven by a motor connected to a drive shaft. These systems provided seals in attempts to prevent food and liquids from entering the drive shaft or motor. Allowing otherwise may lead to corrosion, shorting, or mechanical failures. The seals, however, can increase friction, are subject to wear, and may generate unwanted noise. For example, some seals are positioned so that they abut an axle and a blade. As the axle and blade are driven, the seals or sealing engagement may reduce with respect to the sealing force. For instance, the upper or lower flange may press against the axle, blade, or container with less force than when the motor is not operating.

Figure 5:
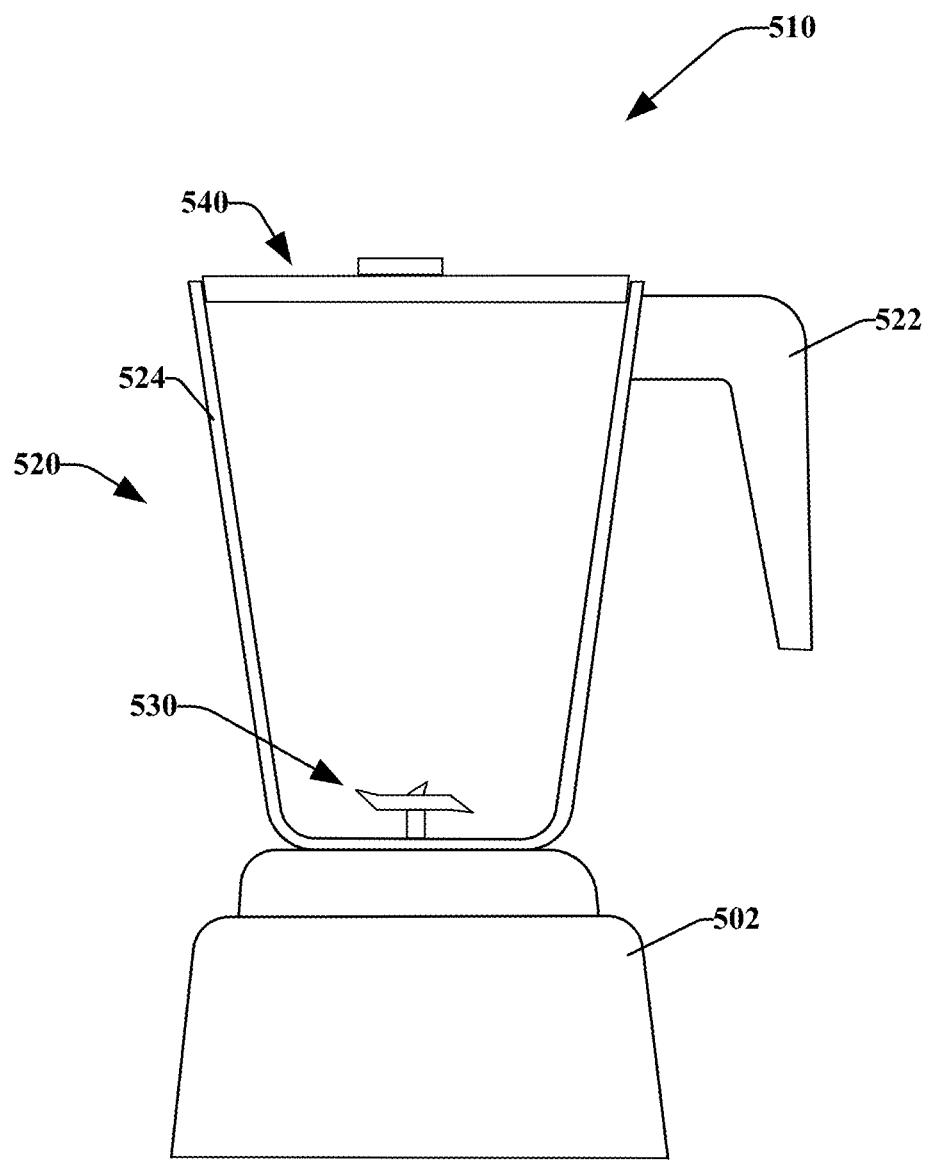
FIG. 5 is a front view of a blending system including a bifurcated seal, in accordance with various disclosed aspects.

Turning to FIG. 1, illustrated is a blending system 100 that may blend, process, mix, or otherwise agitate foodstuff, in accordance with various disclosed aspects. In an aspect, blending system 100 may generally include a blending container 102, a blade assembly 120, bearing housing 130, a bearing mount 140, and a dampening member 150. A motor (not shown) may drive axle 122 of the blade assembly 120 and/or rotate the blades 121. The blades 121 and blade assembly 120 may be removably attached to the axle 122. It is noted that the blades 121 may comprise any desired orientation or configuration and are not limited to those shown and described herein. In another aspect, a blender base (as shown in FIG. 5) may comprise a splined coupler attached to a drive shaft of a motor. The splined coupler of the drive shaft may receive a splined coupler of the blade assembly 120, such that rotation of the motor's drive shaft rotates the blade assembly 120 when the container 102 is operatively attached to the blender base.

According to at least one embodiment, the blade assembly 120 may comprise drive shaft or axle 122 that can be received by bearings 132. The bearings 132 may be disposed within the bearing housing 130. The bearing housing 130 may be mounted to the blending container 102 via the bearing mount 140. In an aspect, the bearings 132 may constrain motion resulting from operation of the motor or rotation of the axle 122. For instance, the bearings 132 may reduce or prevent wobbling of the axle 122 outside of line B-B'. The bearings 132 may comprise metallic bearings and may include oils or other lubricants. Likewise, the axle 122 may comprise a metallic axle. It is noted that the axle 122 and blade assembly 120 may rotate at relatively high speeds. Thus, any debris (e.g., foodstuff, etc.) that enters the axle 122 or bearings 132 may generate noise, heat, wobble, or otherwise negatively affect operation of the blender.

The dampening member 150 may be disposed in a number of differing orientations beyond that shown in FIG. 1. Dampening member 150 is optional, but it may ultimately alter properties of vibrations (e.g., amplitude, frequency, etc.) to reduce generation of perceptible or unpleasant sound.

Bearing mount 140 may be attached to various other components of a blender system. For instance, bearing mount 140 may be attached to the blade assembly 120, where the blade assembly 120 may be removably attached to the container 102. As an example, single serving blender systems may include a container having an open end and a closed end. The open end may attach to a blade assembly, such as via a spindle or screw top. The blade assembly may include bearing mount 140 and/or other bearing mounts described herein. Also, bearing mount 140 may include a stiffening member of a consistent thickness or may be of variable thickness formed from any appropriate material, including, without limitation, plastic, rubber, metal, or a combination of such (not shown).

In an aspect, the blending container 102 may comprise a closed end 112. The closed end 112 may comprise a protrusion or receiving portion 108. The receiving portion 108 may be configured to receive or house at least a portion of the bearing housing 130. It is noted, however, that the closed end 112 may not include the receiving portion 108. In at least one embodiment, the closed end 112 may comprise a generally flat surface having an aperture that allows the blade assembly to pass therethrough.

The axis formed by line B-B' corresponds to the general center point of the blade assembly 120. Typically, at least a portion of the blade assembly 120 operates along a substantially circular arc, with line B-B' running through the center point of that circle. However, it will be understood that the individual components of the system 100 do not necessarily need to exhibit a constant or perfectly circular profile. Moreover, the blade assembly 120 may be disposed at an angle relative to B-B'.

Region 106 in FIG. 1 indicates the location of the exploded views found in FIGS. 3 and 4, as will be described here and elsewhere in this disclosure. It disclosed, a seal/gasket may be disposed proximal an opening 109 between one or more of the axle 122, blades 121, and the receiving portion 108. The seal may generally prevent foodstuff from entering the bearings 132 or other operative components of the system 100. In an example, a user may place foodstuff within a cavity 104 of the container 102. The blender base may drive the blade assembly 120 via a motor. Operation of the motor may generate heat and friction. Disclosed seals prevent foodstuff from exiting the cavity 104 and entering other portions of the system 100 and may provide reduced resistance to flaking or damage due to temperature, friction, or other forces (e.g., contact with foodstuff, etc.).

Figure 2B:
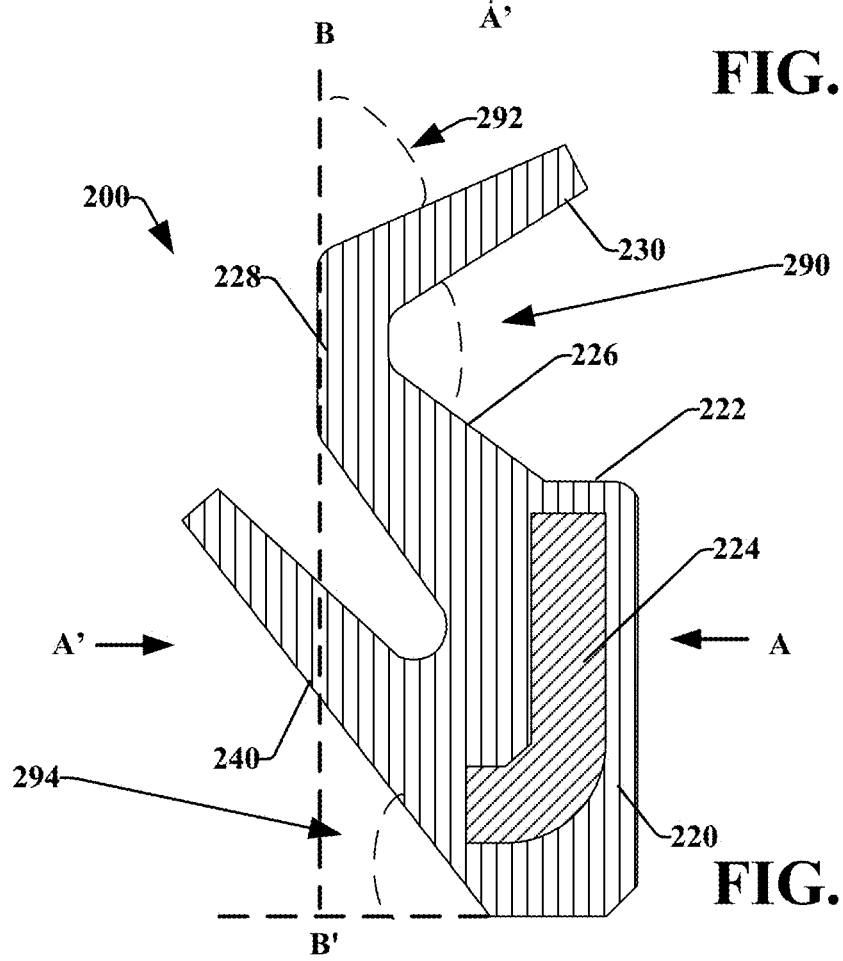
Figure 3:
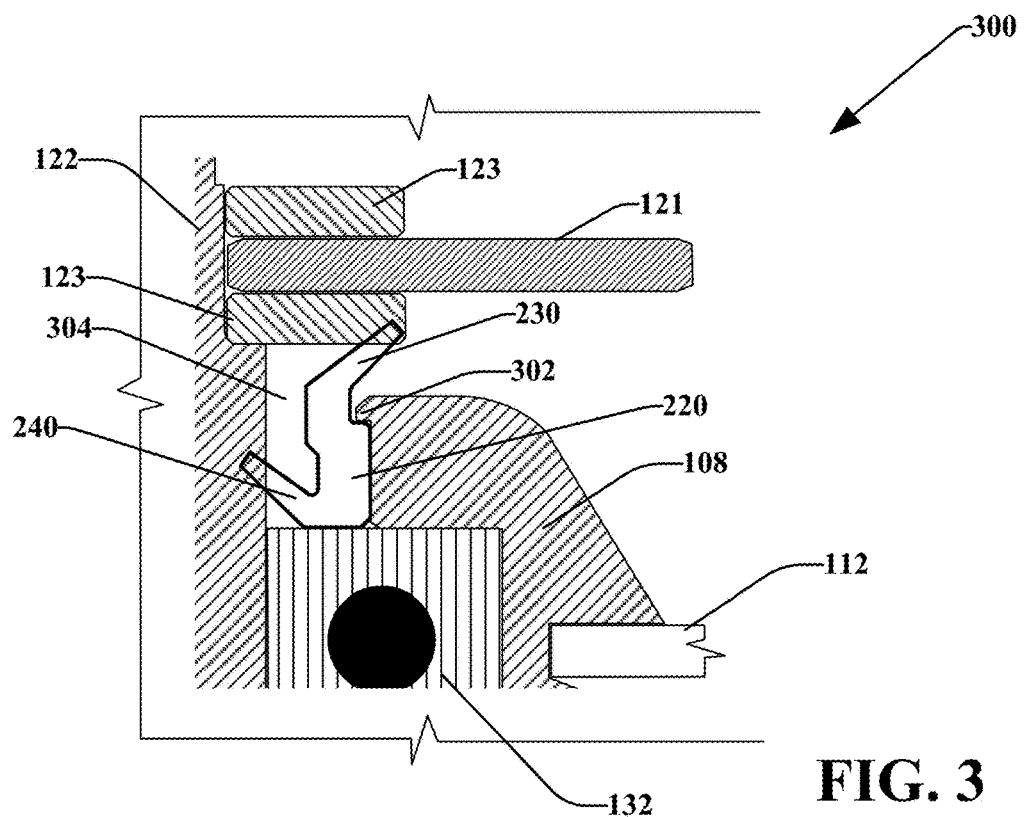
FIG. 3 is an exploded cross-sectional view illustrating the bifurcated nature of the seal, in accordance with various disclosed aspects.

Turning to FIG. 3, with reference to FIGS. 2A-2B, there is an enlarged, cross-sectional view of region 106 of a blending system 300. The blending system 300 may include a bifurcated seal 200 disposed within a blade assembly (e.g., blade assembly 120) as described herein. The bifurcated seal 200 may be positioned relative drive shaft 122 and blades 121 to prevent foodstuff within a cavity 104 from entering the blade assembly. It is noted that like named components of system 300 and 100 may comprise similar aspects. It is further noted, however, that the receiving member 108 is shown as separate from the closed end 122 of the container 102.

With reference to FIGS. 2A and 2B, the bifurcated seal 200 has a circular shape in certain aspects including a central void 210 which receives the drive axle or shaft (which, in turn, engages the blade assembly to operate the blender system). Seal 200 comprises a central body 220 with upper or first flange 230 and lower or second flange 240 arranged about a central void 210 in a frame-like or annular arrangement.

FIG. 2B indicates a cross-section view of the seal 200 oriented along line A-A' (as also seen in FIG. 2A). The upper flange 230 extends at an angle generally away from the axle 122. As shown, the upper flange 230 may extend at an angle away from the axle and either upwards (e.g., FIG. 3) or downwards (e.g., FIG. 4) relative the closed end 112. When angled in the upwards direction, upper flange 230 may engage blade 121 and/or fasteners 123. It is noted that the fasteners may be considered as part of the blade 121 for purposes of brevity. Moreover, blade 121 may be fastened to the axle 122 via other or different components. In at least one embodiment, blade 121 may be permanently affixed to the axle 122.

Figure 4:
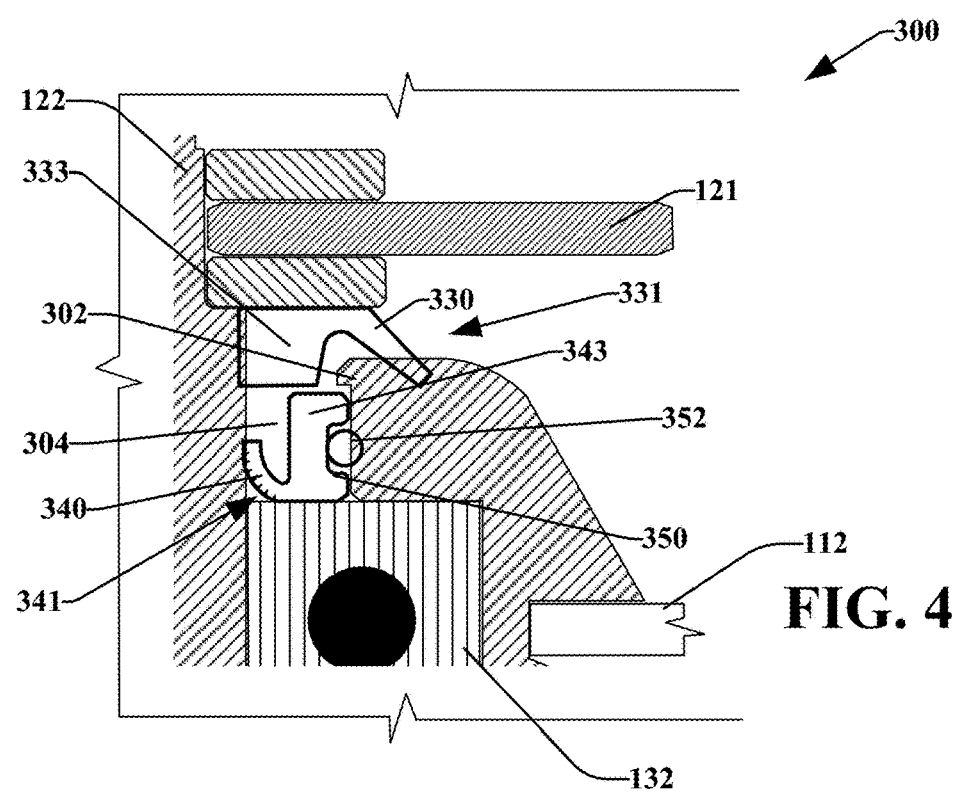
FIG. 4 is an exploded cross-sectional view illustrating the bifurcated nature of the seal, in accordance with various disclosed aspects.

In an alternative or additional embodiment, an upper flange 330 may extend downward, as described in FIG. 4, so that a body 333 (e.g., a first or upper body) abuts and is press fitted (press-fit?) the blade assembly and possibly the axle 122. In either case, the upper flange 230 extends on the outer circumference of the body at or near its upper most portion of a seal (e.g., on the side of the body opposite that of the central void 210 and closed end 112).

Lower flange 240 also preferably tapers at an angle from body 220 towards axle 122, with alternatives contemplating constant or variable thicknesses as above. Lower flange 240 extends inwardly (i.e., toward the central void 210) and upwardly so as to facilitate engagement with axle 122. As seen in FIG. 3, the body 220 may abut and press fit against the bearings 132.

In embodiments, body 220 may itself engage the bearings 132, receiving portion 108, or other portions of system 300. In an aspect, the receiving portion 108 may include a ledge 302 that may extend inwards, towards the axle 122. The body 220 may include a retaining portion 222 that generally abuts the ledge 302 when the seal 200 is pressed within a cavity 304 of the blade assembly 120 that is defined by a space between the axle 122, blades 121, and a receiving portion 108 or the container 102. When assembled, the lower flange 240 presses against the axle 122, while the retaining portion 222 retains the body 220 in position by pressing against the ledge 320. In some aspects, the seal 200 may provide abutment and press fitting along both the upper and lower flanges to ensure a tight fit while still allowing for proper operation of the overall system. As such, the seal 200 may be press-fit or friction fit within the cavity 304 without the need for mechanical fasteners, chemical adhesives, or magnetic fasteners. It is noted, however, that mechanical fasteners, chemical adhesives, or magnetic fasteners may be utilized.

Both flanges 230 and 240 may terminate at a point that is not aligned with the central body in the top view, as seen in FIG. 2A. That is, the terminal end point of upper flange 230 is, respectively speaking at a greater radius than the outer portion of the central body 220, while the terminal point of lower flange 240 possesses a shorter radius in comparison to the inner portion of the central body 220. In some embodiments, one of both of the flanges may align with the central body, although in these cases an angular recess is provided so as to distinguish the flange from the body itself.

The body 220 of the seal may be made of a consistent material, such as rubber or comparable polymeric materials. It may also possess one or more reinforcing members to impart structural integrity. Any such members may be continuous or segmented along portions of the annulus. If provided, they may be inserted, over-molded, or otherwise integrated into the body.

In another aspect, the upper flange 230 may be angled and sized such that it contacts a portion of the blade 121 when the blade 121 is not rotating. Likewise, when the axle 122 is at rest and not rotating, the lower flange 240 is angled and sized to contact the axle 122. The bias of the upper flange 230 may create a seal with the blade 121. The lower flange 240 is biased to form a seal with the axle 122. It is noted that the seal 200 is shown in FIG. 2A in a pre-biased position, the system 300 is assembled, the upper flange 230 when bent to form a seal with the blade 121 and the lower flange 240 will be bent to form a seal with the axle 122.

During operation of the blade assembly 120, a motor rotates the axle 122. Rotation of the axle 122 and blade 121 generate centripetal forces away from the axle 122. When this force becomes larger at higher speeds, the centripetal force pushes the upper flange 230 away from the blade 121. As such, the upper flange 230 may not contact the blade 121 or may not press against the blade 121 with the same amount of force. Accordingly, the upper flange does not experience the same amount of friction as it would if it remained in contact with the same amount of restoring force pressing against the blade 121. This may reduce wear and may prevent or reduce flaking or damaging the upper flange 230. It is further noted that the centripetal force generated by operation of the blade assembly 120 may force foodstuff within the cavity 104 generally away from the axle 122 so that foodstuff does not enter the cavity 304 when the restorative force between the upper flange 230 and the blade 121 is reduced and/or the upper flange 230 is not in contact with the blade 121.

It is noted that the lower flange 240 may also experience centripetal force from rotation of the axle 122 and blade assembly 121. Similarly, but not identically, to the upper flange 230, the lower flange 240 presses against the axle 122 when the motor is not running. At increased speeds, centripetal force pushes the lower flange 240 outwards (e.g., towards side walls of the container). This may reduce the sealing or restorative force between the lower flange 240 and axle 122. In at least one embodiment, the lower flange 240 may come out of contact with axle 122. As such, the friction between the lower flange 240 and the axle 122 is reduced. The reduced friction may reduce or prevent wear on the lower flange 240 and/or flaking of the lower flange 240. Moreover, should any foodstuff enter the cavity 304, it will be retained between the lower flange 240 and the body 220.

In one or more embodiments, the body 220 may include a stiffening member 224 disposed therein. The stiffening member 224 may be annularly shaped and may comprise a material that is generally stiffer or more rigid then the material of the rest of the seal 200. For instance, the seal may comprise a polymeric material, including but not limited to polytetrafluoroethylene (PTFE), PTFE based compounds, polyether ether ketone (PEEK), ultra-high-molecular-weigh polyethylene (UHMW), polychlorotrifluoroethylene (PCTFE), polyester/elastomer, or other materials. The stiffening member 224 may comprise a metal disposed therein.

In an exemplary embodiment, the upper flange 230 may include a first portion 226 extending inwards and upwards from the retaining portion 222. A second portion 228 may extend at an angle from the first portion 226. The angle 290 between the second portion 228 and the first portion may be generally between 50 and 75 degrees. In an embodiment, the angle 290 may be approximately 69 degrees. The angle 292 between the second portion 228 and the axis B-B' may be generally between 50 and 75 degrees. In an embodiment, the angle 292 may be generally 67 degrees. According to an example, the angle of the upper flange 230 may be defined by the angle 292. In another aspect, the lower flange 240 may extend upwards from the horizon at an angle 294 of generally between 40 and 60 degrees. In an embodiment, the angle 294 may be generally 52 degrees. It is noted that other angles within the above ranges may be utilized. In other embodiments, angles outside the above flanges may be utilized.

FIG. 4 illustrates an embodiment in which a bifurcated seal 300 encompasses two separate annular rings, an upper ring 331 (comprising an upper flange 330) and a lower ring 341 (comprising a lower flange 340. Upper ring 331 includes the upper flange 330, as described in the above aspects, and a body 333. It is noted that the body 333 may be sized to contact the ledge 302 to prevent the upper ring 331 from exiting the cavity 304. In embodiments, the upper flange 330 extends at an angle generally downwards towards the closed end 112 of the container 102 and away from the axle 122. Moreover, the upper flange 330 is shown in a pre-deformed position to illustrate the bias of the upper flange 330. When assembled, the upper flange 330 when pressed against the receiving member 108 form a seal therewith. At sufficiently high speeds of operation of the axle 122 and blades 121, the sealing force between the upper flange 330 and the engagement portion 108 may lessen and/or the upper flange 330 may no longer contact the engagement portion 108. In another aspect, the body 333 may be forced out of contact with the axle 122 and/or the force between the body 333 and axle 122 may lessen as the body 333 is forced outwards (it is noted that FIG. 4 illustrates the bias position pre-operation of the motor).

The lower ring 341 generally includes the lower flange 340, extending inwards from a body 343 (e.g., a second or lower body), an annular channel 350 disposed on an outer surface of the lower ring 241, and an annular sealing ring 352 positioned in the channel between the body 343 and the receiving member 108. In an aspect, the lower ring 341 may engage the bearings 132 the axle 122, the upper ring 331 and the receiving member 108 within the cavity 304. It is noted that the lower ring 341 may be generally press fit within the cavity 304. As described here as well as elsewhere, the lower flange 340 may contact and press fit against the axle 122. Operation of the axle 122 may cause the lower flange 340 to disengage or lessen the force against the axle 122. The lower body 341 is retained by the ledge 302 and/or the upper ring 331. The body 343 presses against the annular ring 352. The lower ring 341 and upper ring 332 may be deformed and create a seal with each other so that neither becomes dislodged.

Taken together, rings 331 and 341 cooperate to provide the bifurcated seal 300 even though the rings themselves may be manufactured and installed as separate parts. In some embodiments, rings 331 and 341 may be adhered, joined, or otherwise fitted so as to present a unitary structure even if they are composed of differing materials.

Although the seals described herein are provided in a portion of the container 102 that is exposed to foodstuffs and/or liquid, the centrifugal action of the blender system itself may prevent food from accumulating between the seals and the shaft 122. Insofar as the seal 200 is expected to encounter and tolerate high surface speed owing to its engagement with the blade assembly and/or drive shaft, the materials should be selected appropriately. For example, the lower flange may comprise a polymeric material, including but not limited to polytetrafluoroethylene (PTFE) and similar materials, or a rubber. The upper flange is preferably formed from rubber. Other comparably performing materials are contemplated. Such materials may possess any of the following characteristics: low cost, moldable or otherwise amenable to forming and/or machining, food-safe, relatively impervious to liquid impregnation or damage, pliable, resilient, washable, capable of withstanding temperature extremes commonly associated with foodstuffs (e.g., from slightly below freezing/−5 to 0 degrees Celsius up through common baking temperatures/80 to 260 degrees Celsius), low friction, and/or tolerant of expansion/contraction cycles, flaking, cracking, and wear.

In another aspect, it is noted that a blade assembly may be attachable to a blending container, such as in single serving blending containers. As such, bearing mounts may be attached to the blade assembly, which may be attached to the blending container. Such embodiments are considered within the scope and spirit of this disclosure.

Further, while the seal is shown as disposed proximate to the blade assembly, it may still be possible to incorporate a bifurcated seal, in any of its disclosed aspects, within other locations of the blender, container, and blending assembly.

FIG. 5 illustrates an exemplary blending system 500 in accordance with various disclosed embodiments. System 500 may utilize various disclosed aspects. For instance, system 500 may include a bifurcated seal as described with reference to FIGS. 1-4.

System 500 primarily includes a blender base 502, a container 520 operatively attachable to the blender base 502, a blade assembly 530 (which may include a bifurcated seal), and a lid 540 that may be operatively attached to the container. The container 520 may include walls 524 and a handle 522. Foodstuff may be added to the container 520 for blending. It is noted that the container 520 may comprise various materials such as plastics, glass, metals, or the like. In another aspect, container 520 may be powered in any appropriate manner, such as disclosed in U.S. patent application Ser. No. 14/213,557, entitled Powered Blending Container, which is hereby incorporated by reference.

The blade assembly 530, container 520, and base 502 may removably or irremovably attach. The container 520 may be powered in any appropriate manner, such as disclosed in U.S. patent application Ser. No. 14/213,557, entitled Powered Blending Container, which is hereby incorporated by reference. While shown as a large-format system, system 100 may comprise a single serving style system, where the container is filled, a blender base is attached to the container, and then the container is inverted and placed on a base.

The base 502 includes a motor disposed within a housing. The motor selectively drives the blade assembly 530 (e.g., cutting blades, chopping blades, whipping blades, spiralizing blades, etc.). The blade assembly 530 may agitate, impart heat, or otherwise interact with contents within the container. Operation of the blender system 100 may impart heat into the contents within container 520.

In at least one embodiment, the blending system 500 may identify or detect whether the system 500 is interlocked through mechanical detection (e.g., push rods), user input, image recognition, magnetic detection (e.g., reed switches), electronic detection (e.g., inductive coils, a near field communication (NFC) component), or the like.

System 500 and processes described herein generally relate to blending or food-processing systems and include a food-processing disc comprising one or more inductive coils. In another aspect, one or more of the disc and/or lid may comprise an NFC component that may interact with an NFC component of a blender base. The NFC component of the blender base may receive information regarding the type of the disc and may utilize the blender base and may utilize the information to determine a blending process to be utilized by the system.

It is noted that the various embodiments described herein may include other components and/or functionality. It is further noted that while described embodiments refer to a blender or a blender system, various other systems may be utilized in view of the described embodiments. For example, embodiments may be utilized in food processor systems, mixing systems, hand-held blender systems, various other food preparation systems, and the like. As such, references to a blender, blender system, and the like, are understood to include food processor systems, and other mixing systems. Such systems generally include a blender base that may include a motor, a blade assembly, and a controller. Further, such systems may include a container, a display, a memory or a processor.

As used herein, the phrases "blending process," "blending program," and the like are used interchangeably unless context suggests otherwise or warrants a particular distinction among such terms. A blending process may comprise a series or sequence of blender settings and operations to be carried out by the system 500. In an aspect, a blending process may comprise at least one motor speed and at least one time interval for the given motor speed. For example, a blending process may comprise a series of blender motor speeds to operate the blender blade at the given speed, a series of time intervals corresponding to the given motor speeds, and other blender parameters and timing settings. The blending process may further include a ramp up speed that defines the amount of time the motor takes to reach its predetermined motor speed. The blending process may be stored on (in?) a memory and recalled by or communicated to the blending device.

Although the embodiments of this disclosure have been illustrated in the accompanying drawings and described in the foregoing detailed description, it is to be understood that the present disclosure is not to be limited to just the described embodiments, but that the embodiments described herein are capable of numerous rearrangements, modifications and substitutions without departing from the scope of the claims hereafter. It is, of course, not possible to describe every conceivable combination of components or methodologies for purposes of describing the present specification, but one of ordinary skill in the art may recognize that many further combinations and permutations of the present specification are possible.

Each of the components described above may be combined or added together in any permutation to define a blending system. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. The claims as follows are intended to include all modifications and alterations insofar as they come within the scope of the claims or the equivalent thereof. The drawings are similarly incorporated as part of the disclosure, and the relative positioning of/relationships between the element and any numeric, written or symbological information expressed therein are expressly considered part of this specification.

What is claimed is:

1. A blending system comprising:
a blender base;
a blending container comprising side walls that define a cavity, an open end, and a closed end, wherein the blending container is operatively attachable to the blender base such that the closed end contacts the blender base, and the open end is distal to the closed end;
a blade assembly operatively attached to the blending container and comprising:
an axle;
a blade operatively attached to the axle; and
an annular seal disposed around the axle and proximal the blade,
wherein the annular seal comprises a body comprising an upper flange extending away from the axle, and a lower flange extending towards and contacting the axle, whereby the upper flange is positioned above the lower flange relative the closed end of the blending container when the blending container is operatively positioned on the blender base.

2. The blending system of claim 1, wherein the blending container further comprises a receiving member comprising an aperture that receives the axle.

3. The blending system of claim 2, wherein the upper flange sealingly engages the receiving member.

4. The blending system of claim 2, wherein the annular seal is disposed within a cavity defined at least in part by the axle, blade, and receiving member.

5. The blending system of claim 4, further comprising a bearing assembly disposed about the axle.

6. The blending system of claim 5, wherein the cavity is further defined by the bearing assembly.

7. The blending system of claim 1, wherein the upper flange extends at an upwards angle relative the closed end of the blending container.

8. The blending system of claim 1, wherein the upper flange extends at a downwards angle relative the closed end of the blending container.

9. The blending system of claim 1, wherein the lower flange extends at an upwards angle relative the closed end of the container.

10. The blending system of claim 1, wherein the lower flange deforms around the axle to create a seal therewith.

11. The blending system of claim 1, wherein the upper flange sealingly engages the blade.

12. A blender system comprising:
a blender base comprising a motor and a splined coupler;
a blending container comprising a closed end and an open end, wherein the blending container is operatively attachable to the blender base such that the closed end is proximal the blender base and the open end is distal to the blender base;
a blade assembly operatively attachable to the closed end of the blending container, wherein the blade assembly comprises:
a shaft comprising a splined end operatively attachable with the splined coupler;
a blade extending from the shaft; and
a seal disposed about the shaft and proximal the blade, and comprising an upper flange and a lower flange, wherein the upper flange is operatively disposed between the blade and the lower flange,
wherein the upper flange extends away from the shaft and is biased to contact and sealingly engage with at least one of the blade or the blending container when the motor is not driving the shaft and the lower flange extends towards the shaft.

13. The blender system of claim 12, wherein the seal further comprises a body, and wherein the upper flange extends from the body.

14. The blender system of claim 13, wherein the body does not contact the shaft when the motor operatively drives the shaft at a threshold speed.

15. The blender system of claim 12, wherein the seal comprises an upper body and a lower body that are separate from each other.

16. The blender system of claim 12, wherein a force of the sealingly engagement of the upper flange and at least one of the blade or the blending container is lessened when the motor operatively drives the shaft at a threshold speed.

17. A blender system comprising:
a blender base comprising a housing that houses a motor;
a blending container comprising a closed end that abuts and is operatively attachable to the housing;
a blade assembly operatively attachable to the blending container, wherein the blade assembly comprises:
a shaft;
a blade extending from the shaft;
a bearing assembly; and
a gasket comprising an upper flange and a lower flange, wherein the gasket operatively contacts the shaft,
wherein the closed end of the blending container further comprises a receiving portion comprising an opening that operatively receives the shaft,
wherein the gasket is disposed within a cavity defined at least in part by the receiving portion, the bearing assembly, the blade, and the shaft, and
wherein the upper flange is operatively positioned between the receiving portion and the lower flange and the lower flange extends towards the shaft.

18. The blender system of claim 17, wherein the gasket operatively comprises a polymeric material.

19. The blender system of claim 18, wherein the polymeric material comprises at least one of polytetrafluoroethylene, a polytetrafluoroethylene based compound, polyether ether ketone, ultra-high-molecular-weigh polyethylene, polychlorotrifluoroethylene, or a polyester/elastomer.

20. The blender system of claim 18, wherein the gasket is press-fit within the cavity.

* * * * *